United States Patent
Garrison et al.

(10) Patent No.: US 9,631,811 B2
(45) Date of Patent: Apr. 25, 2017

(54) DRAFT INDUCER FOR LOW POWER MULTISTAGE FURNACES UTILIZING AN ELECTRONICALLY COMMUTATED MOTOR SYSTEM AND AN ASSOCIATED METHOD OF USE

(71) Applicant: RBC Manufacturing Corporation, Beloit, WI (US)

(72) Inventors: Bobby D. Garrison, Cassville, MO (US); Michael D. Smith, Rogers, AR (US); Jeffrey J. Long, Purdy, MO (US)

(73) Assignee: Regal Beloit America, Inc., Beloit, WI (US)

( * ) Notice: Subject to any disclaimer, the term of this patent is extended or adjusted under 35 U.S.C. 154(b) by 1174 days.

(21) Appl. No.: 13/672,207

(22) Filed: Nov. 8, 2012

(65) Prior Publication Data
US 2014/0127632 A1    May 8, 2014

(51) Int. Cl.
*F23N 3/00* (2006.01)
*F24H 9/20* (2006.01)
*F23L 17/00* (2006.01)
*F23N 3/08* (2006.01)
*F04D 17/08* (2006.01)
(Continued)

(52) U.S. Cl.
CPC ............ *F23L 17/005* (2013.01); *F04D 17/08* (2013.01); *F04D 25/06* (2013.01); *F04D 27/004* (2013.01); *F04D 29/5806* (2013.01); *F23N 3/085* (2013.01); *F23N 3/087* (2013.01); *F24H 9/0068* (2013.01); *H02K 9/06* (2013.01); *H02K 11/33* (2016.01); *F23N 2033/04* (2013.01)

(58) Field of Classification Search
CPC ........ F23L 17/005; F23J 11/00; F24H 9/0068; F23N 3/087
USPC ...................... 431/20, 12; 126/116 A, 104 A
See application file for complete search history.

(56) References Cited

U.S. PATENT DOCUMENTS

| | | | |
|---|---|---|---|
| 2,234,926 A | * | 3/1941 | Jepson .................... F02P 1/005 173/217 |
| 4,648,551 A | | 3/1987 | Thompson et al. |

(Continued)

OTHER PUBLICATIONS

"Access Floor Products LHK, PFC, TAF-R, TAF-HC, TAF-D, and TAF-V", Titus Installation Manual AF-IOM-1.0, Sep. 26, 2005, 6 pages.

(Continued)

*Primary Examiner* — Avinash Savani
*Assistant Examiner* — Vivek Shirsat
(74) *Attorney, Agent, or Firm* — Thompson Coburn LLP (57) ABSTRACT

A furnace assembly comprising a non-condensing furnace with a draft inducer. The draft inducer includes a permanent magnet electrically commutated motor and a draft inducer blower fan. The motor includes a stator, a rotor, a motor cooling fan, and a controller. The rotor being rotatable relative to the stator, the fan being operatively coupled to the rotor such that rotation of the rotor causes rotation of the fan, the controller being configured to selectively operate the motor in first and second different torque ranges of the rotor, with the first and second torque range operating within a fixed percentage and within a fixed percentage of each other. The controller being configured such during normal operation, the motor is not operable at any torques between the first torque range and the second torque range except during transitionary periods.

11 Claims, 6 Drawing Sheets

(51) Int. Cl.
*F04D 25/06* (2006.01)
*F04D 27/00* (2006.01)
*F04D 29/58* (2006.01)
*F24H 9/00* (2006.01)
*H02K 9/06* (2006.01)
*H02K 11/33* (2016.01)

(56) References Cited

U.S. PATENT DOCUMENTS

| | | | |
|---|---|---|---|
| 5,006,744 | A | 4/1991 | Archer et al. |
| 5,227,704 | A | 7/1993 | Erdman |
| 5,306,976 | A | 4/1994 | Beckman |
| 5,391,837 | A | 2/1995 | Carey |
| 5,519,273 | A | 5/1996 | Keck |
| 5,592,058 | A | 1/1997 | Archer et al. |
| 5,791,332 | A * | 8/1998 | Thompson ............ F23N 1/062 126/116 A |
| 6,020,667 | A | 2/2000 | Carey et al. |
| 6,196,803 | B1 | 3/2001 | Hill et al. |
| 6,348,752 | B1 | 2/2002 | Erdman et al. |
| 6,369,536 | B2 | 4/2002 | Beifus et al. |
| 6,408,502 | B1 | 6/2002 | Brahmavar et al. |
| 6,423,118 | B1 | 7/2002 | Becerra et al. |
| 7,568,885 | B2 | 8/2009 | Parker et al. |
| 7,594,798 | B1 | 9/2009 | Bucher et al. |
| 2001/0038794 | A1 * | 11/2001 | Stewart ............... F23L 17/005 417/53 |
| 2004/0051496 | A1 | 3/2004 | Archer et al. |
| 2005/0281672 | A1 | 12/2005 | Parker et al. |
| 2006/0261690 | A1 | 11/2006 | Petersen |
| 2010/0247316 | A1 | 9/2010 | Aynsley et al. |
| 2011/0204832 | A1 | 8/2011 | Zavodny et al. |

OTHER PUBLICATIONS

"ECM motors on whole house fan . . . ", HVACquick.com website—http://blog.hvacquick.com/?s=ecm (Blog posted on Jun. 30, 2010), Printed off website on Nov. 7, 2012, pp. 1-2.

"ECMotor Replacement Reward—$150 Reward for ECMotor Replacement—Offer Good Through Feb. 28, 2013", Minnesota Power Website—http://www.mnpower.com/powerofone/one_home/hvac/specials/ECM%20Fan%20Motor%20Replacement%20Rebate/index.htm (Printed from website on Nov. 7, 2012), pp. 1-2.

"Fan Powered Terminals VAV Terminals", Titus Installation Manual FB-IOM-1.0, Jul. 27, 2006, 6 pages.

"Price Underfloor Products Service & Installation Manual", www/price-hvac.com, Jun. 2011, pp. 1-31, Reference No. I-10.

Ehrlich, "A New Spin on Efficient Home Ceiling Fans", Posted on Apr. 4, 2011 on http://greenspec.building green.com./blogs/new-spin-efficient-home-ceiling-fans (Printed from website on Nov. 7, 2011), pp. 1-4.

* cited by examiner

DRAFT INDUCER FOR LOW POWER MULTISTAGE FURNACES UTILIZING AN ELECTRONICALLY COMMUTATED MOTOR SYSTEM AND AN ASSOCIATED METHOD OF USE

SUMMARY OF INVENTION

In one aspect of the invention, a furnace assembly includes a non-condensing furnace with a draft inducer. The draft inducer includes a permanent magnet electrically commutated motor and a draft inducer blower fan. The motor comprises a stator, a rotor, a motor cooling fan, and a controller. The rotor is rotatable relative to the stator. The motor cooling fan is operatively coupled to the rotor such that rotation of the rotor causes rotation of the motor cooling fan. The motor cooling fan is configured and positioned to move air in a manner to cool at least some components of the motor. The draft inducer blower fan is operatively coupled to the rotor such that rotation of the rotor causes rotation of the draft inducer blower fan. The controller is configured to selectively operate the motor in first and second different torque ranges of the rotor. The first torque range constitutes a first torque and all torques within five percent of the first torque. The second torque range constitutes a second torque and all torques within five percent of the second torque. The magnitude of the second torque is less than about seventy percent of the magnitude of the first torque. The controller is configured such that during normal operation of the furnace assembly the motor is not operable at any torques between the first torque range and the second torque range except during transitionary periods in which the controller switches operation of the motor between the first torque range and the second torque range or the motor transitions between on and off states.

In another aspect of the invention, a furnace assembly includes a non-condensing furnace with a draft inducer. The draft inducer includes a permanent magnet electrically commutated motor and a draft inducer blower fan. The motor comprises a stator, a rotor, a motor cooling fan, and a controller. The rotor is rotatable relative to the stator. The motor cooling fan is operatively coupled to the rotor such that rotation of the rotor causes rotation of the motor cooling fan. The motor cooling fan is configured and positioned to move air in a manner to cool at least some components of the motor. The draft inducer blower fan is operatively coupled to the rotor such that rotation of the rotor causes rotation of the draft inducer blower fan. The controller is configured to selectively operate the motor in first and second different rotational speed ranges of the rotor. The first rotational speed range constitutes a first rotational speed and all rotational speeds within five percent of the first rotational speed. The second rotational speed range constitutes a second rotational speed and all rotational speeds within five percent of the second rotational speed. The magnitude of the second rotational speed is less than about seventy percent of the magnitude of the first rotational speed. The controller is configured such that during normal operation of the furnace assembly, the motor is not operable at any rotational speeds between the first rotational speed range and the second rotational speed range except during transitionary periods in which the controller switches operation of the motor between the first rotational speed range and the second rotational speed range or the motor transitions between on and off states.

Still yet another aspect of the present invention is a method for operating a furnace assembly. The method includes selectively operating a permanent magnet electrically commutated motor and a draft inducer blower fan for a draft inducer of a non-condensing furnace. The motor comprises a stator, a rotor, a motor cooling fan, and a controller. The rotor is rotatable relative to the stator and the motor cooling fan is operatively coupled to the rotor such that rotation of the rotor causes rotation of the motor cooling fan. The motor cooling fan is configured and positioned to move air in a manner to cool at least some components of the motor. The draft inducer blower fan is operatively coupled to the rotor such that rotation of the rotor causes rotation of the draft inducer blower fan. The controller controls the motor in first and second different torque ranges of the rotor. The first torque range constitutes a first torque and all torques within five percent of the first torque. The second torque range constitutes a second torque and all torques within five percent of the second torque. The magnitude of the second torque is less than about seventy percent of the magnitude of the first torque. The controller is configured such that during normal operation of the furnace assembly, the motor is not operable at any torques between the first torque range and the second torque range except during transitionary periods in which the controller switches operation of the motor between the first torque range and the second torque range or the motor transitions between on and off states.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

Figure 1:
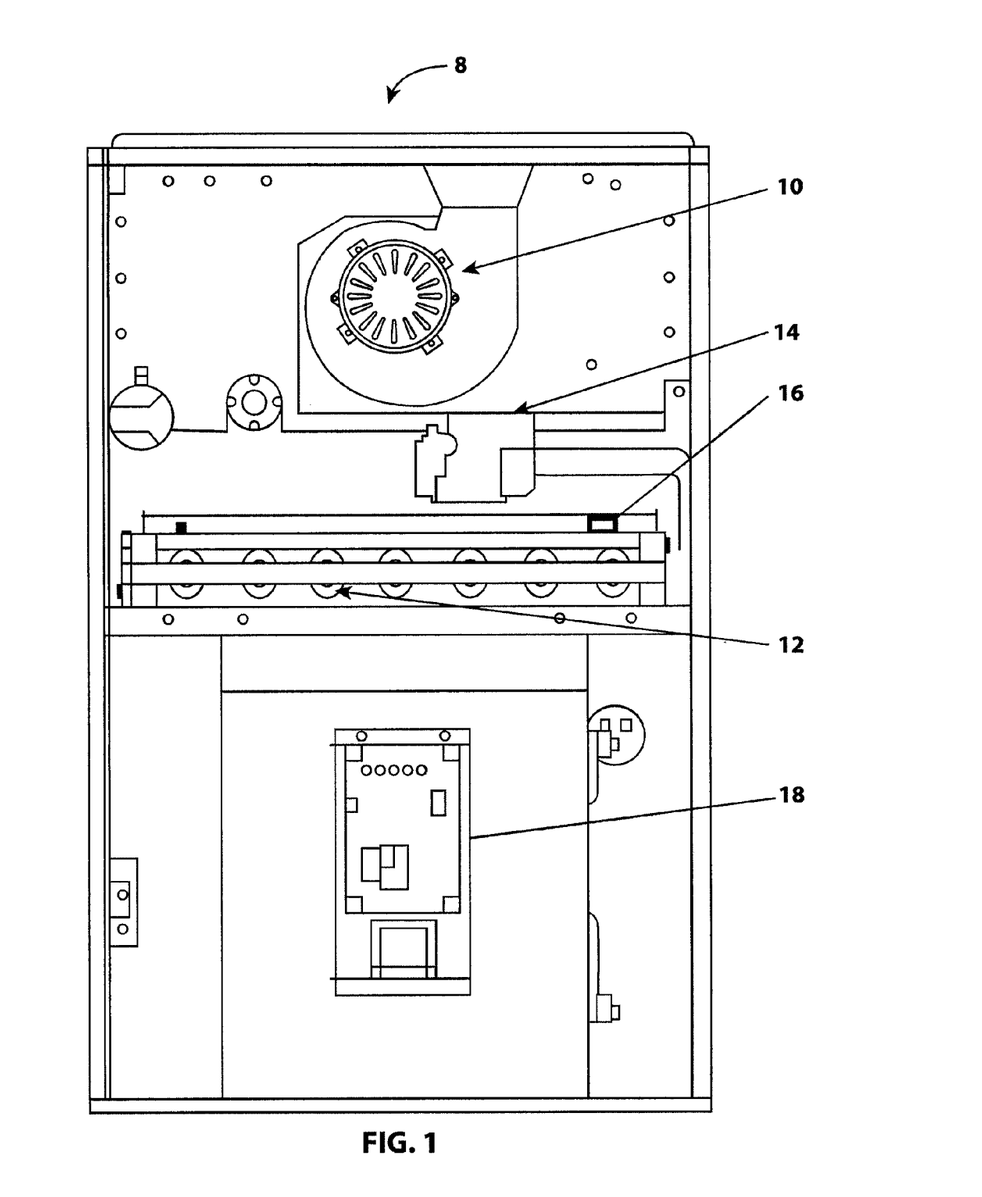
FIG. 1 is a schematic side view of a representative non-condensing furnace with a draft inducer of the present invention.

Referring now to FIG. 1, an illustrative, but nonlimiting, example of a low power, multistate, non-condensing furnace, e.g., 80+ furnace, is represented generally by reference numeral 8. The furnace preferably comprises a draft inducer 10, a plurality of gas burners 12, a gas valve 14 and an ignitor 16. Draft inducer 10 draws combustion gasses from the furnace. Control panel 18 provides operation and potential diagnostics of the furnace 8.

Figure 2:
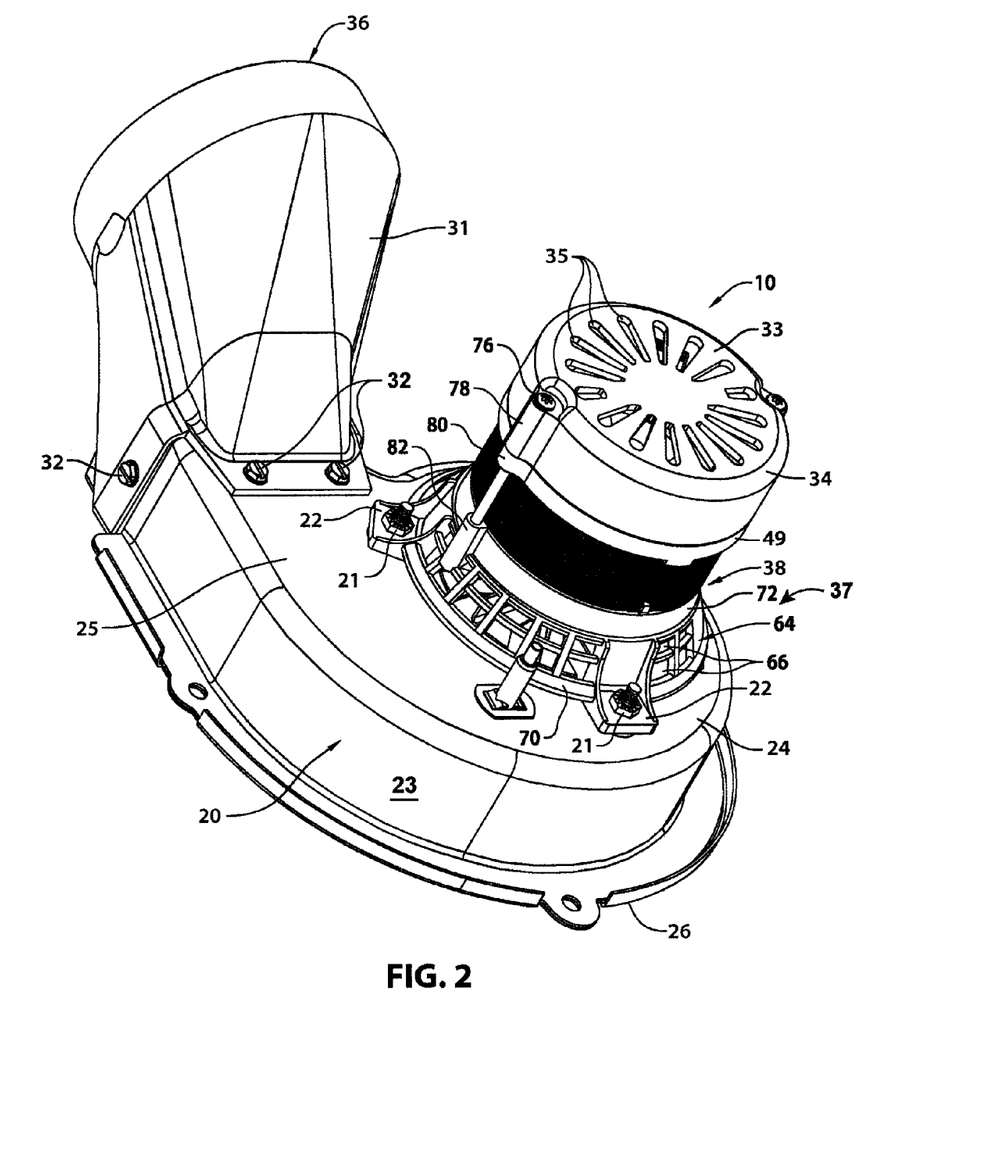
FIG. 2 is a perspective view of the draft inducer of FIG. 1, the draft inducer comprising a draft inducer motor and a fan assembly.

Draft inducer 10 mounts to a blower assembly 20 by a series of attachment mechanisms 21, e.g., nut and bolt combinations through the plurality of securable support members 22. An illustrative structure for providing air flow, FIGS. 2 and 3, with the draft inducer 10 mounted to a blower assembly 20 by a series of attachment mechanisms 21, e.g., nut and bolt combinations through the plurality of securable support members 22. Any of a wide variety of shapes and configurations may suffice for the blower assembly 20. The preferred, but nonlimiting embodiment, includes a curved outer shell 23 having a main top portion 24, e.g., a generally circular portion, and an outer extension 25, e.g., a generally rectangular protrusion.

Figure 3:
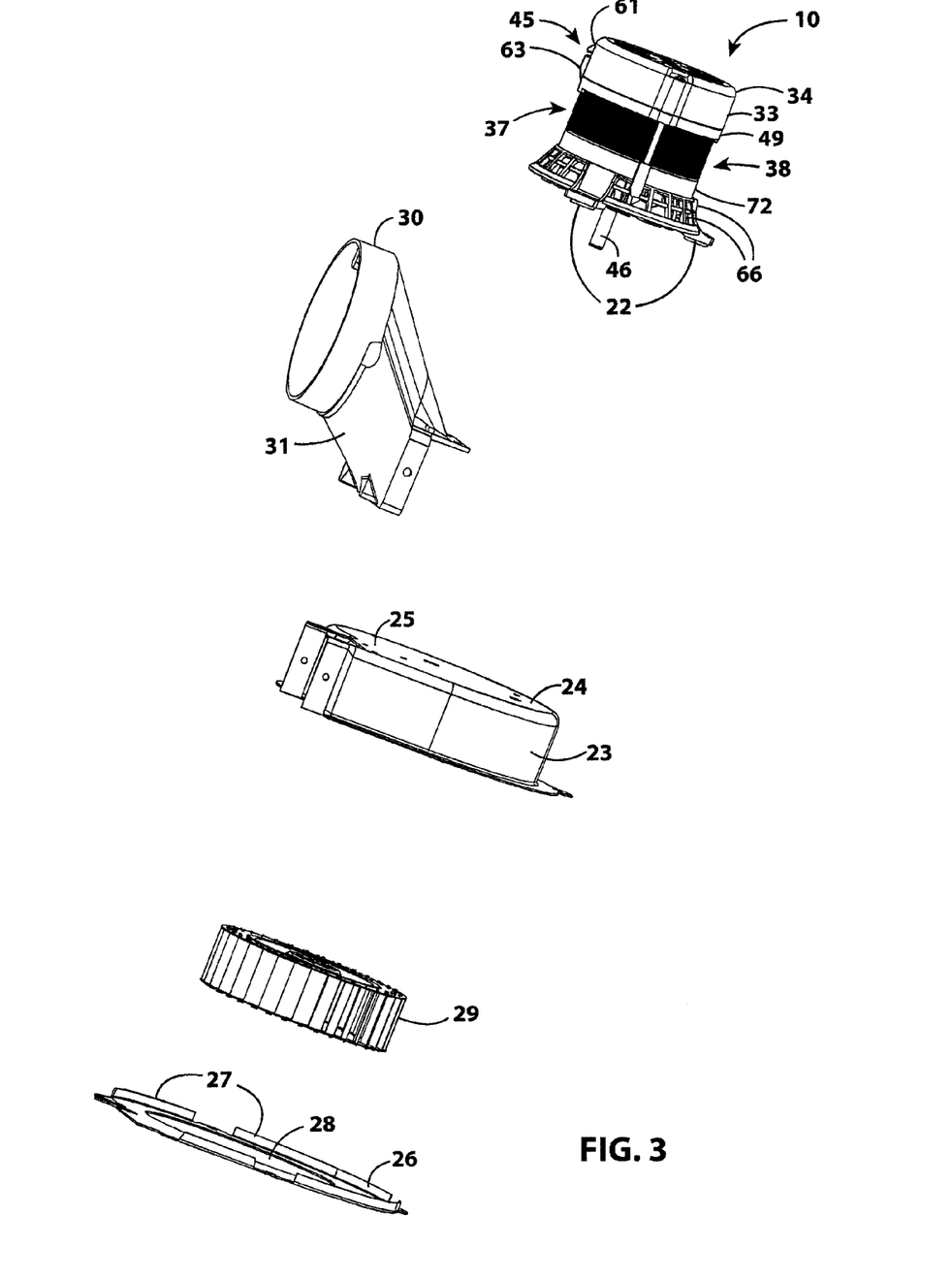
FIG. 3 is an exploded view of the draft inducer of FIG. 2.
Figure 4:
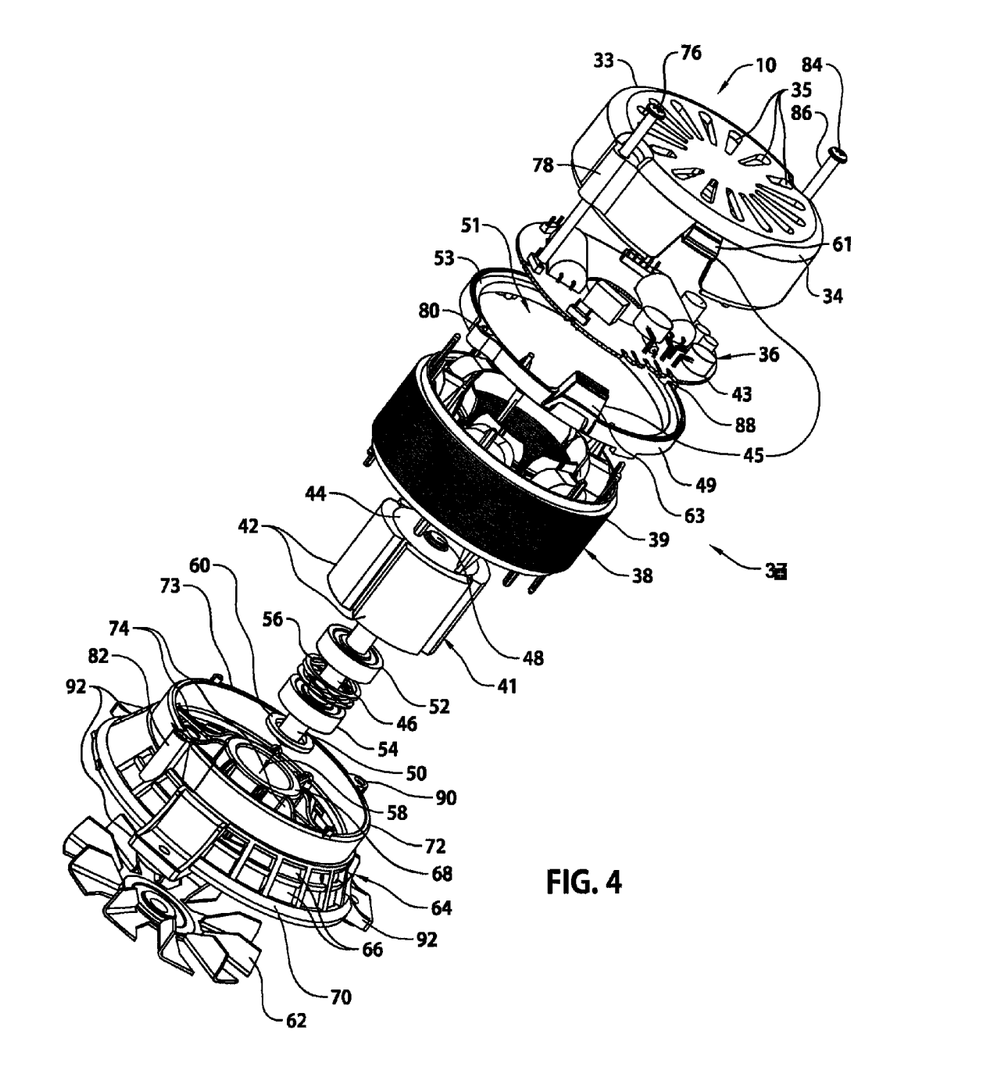
FIG. 4 is an exploded perspective view of the draft inducer motor of FIGS. 2 and 3.

As best shown in FIG. 3, there is a bottom support member 26 with protruding flange members 27. Protruding flange members 27 connect to the curved outer shell 23. The bottom support member 26 includes an aperture 28 to receive heated air through an opening from the plurality of burners 12, previously shown in FIG. 1. In FIG. 4, draft inducer blower fan 29 or impeller fan is driven by a permanent magnet electrically commuted motor 37. Air blown from the draft inducer blower fan 29 of the draft inducer 10 exits the outer extension 25 through an outlet 30. Draft inducer blower fan 29 can be any of a myriad of designs that blow air utilizing a draft inducer 10.

The draft inducer preferably includes a conduit 31. The conduit 31 transitions between the outlet 30 and the outer extension 25. The outer extension 25 may be secured to the conduit 31 by conventional means, such as by threaded fasteners 32.

Figure 5:
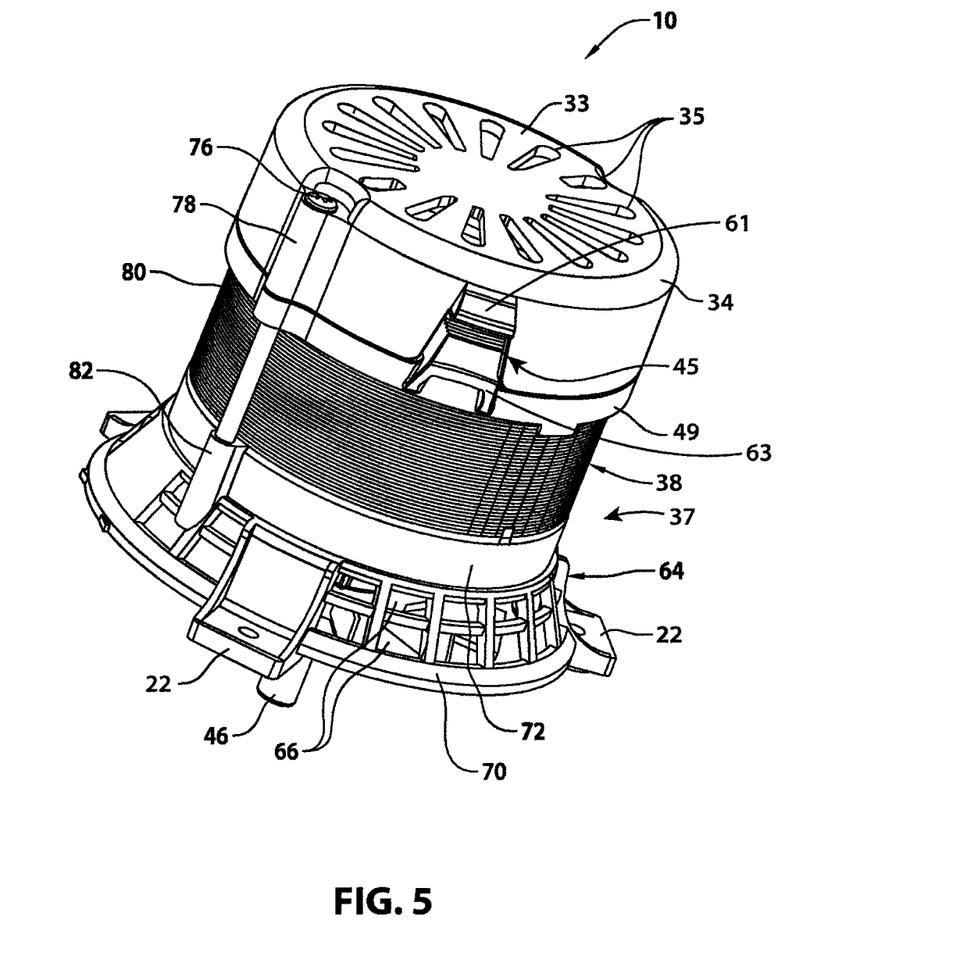
FIG. 5 is an assembled perspective view of the draft inducer motor of FIG. 4.
Figure 6:
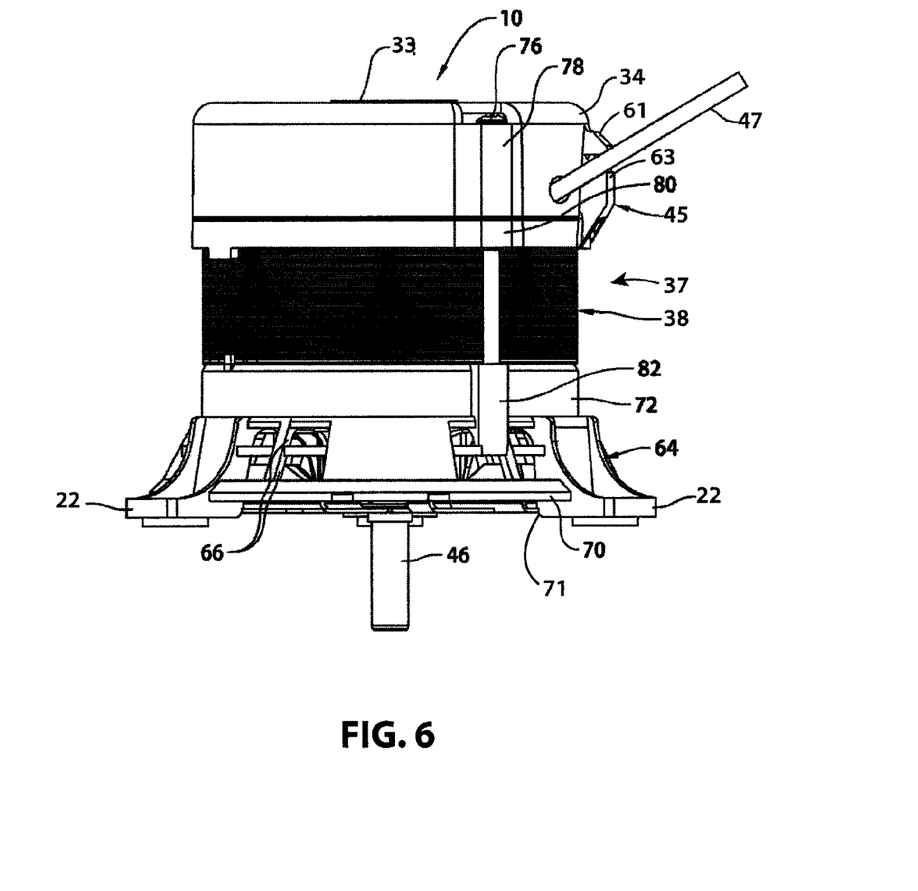
FIG. 6 is a side view of the draft inducer motor of FIG. 5.

Referring to FIGS. 4-6, the permanent magnet electrically commutated motor 37 includes an end cap 33, of any of a wide variety of geometric shapes and is preferably, but not necessarily, cylindrical. End cap 33 may optionally include a beveled outer ring 34 located on the top portion of the end cap 33. Preferably, the end cap 33 includes a plurality of air openings 35, e.g., sixteen (16) to provide for the flow of air through the motor 37. End cap 33 is preferably of polymeric resinous material, since a bearing assembly is not in close proximity.

The motor 37 includes a stator 38 and a rotor 41. The controller 36 is electronic, integral, programmable and capable of controlling the motor 37. Precision control by the controller 36 keeps destructively corrosive condensate from forming at the low speed. Rotor 41 is rotatable relative to the stator 38. Preferably, controller 36 selectively operates the motor 37 in first and second different torque ranges. The first torque range constitutes a first torque and all torques within a first percentage of the first torque. The second torque range constitutes a second torque and all torques within a second percentage of the second torque, the magnitude of the second torque is preferably less than about seventy percent of the magnitude of the first torque, the controller 36 being configured such during normal operation of the low power multistage furnace 8, the rotor 41 is not operable at any torques between the first torque range and the second torque range except during transitionary periods in which the controller 36 switches operation between the first torque range and the second torque range or when the permanent magnet electrically commuted motor 31 transitions between on and off states. This first percentage of the first torque is preferably plus or minus five percent of the first torque and the second percentage of the second torque is preferably plus or minus five percent of the second torque. More preferably, the first percentage of the first torque is plus or minus three percent of the first torque and the second percentage of the second torque is plus or minus three percent of the second torque. Even more preferably the first percentage of the first torque is plus or minus two percent of the first torque and the second percentage of the second torque is plus or minus two percent of the second torque. Even more preferably, the first percentage of the first torque is plus or minus one and one-half percent of the first torque and the second percentage of the second torque is one and one-half percent of the second torque.

Preferably, the magnitude of the second torque is less than about sixty percent of the magnitude of the first torque and the magnitude of the second torque is less than about fifty percent of the magnitude of the first torque. Illustrative, but nonlimiting, example of the first torque includes about 11 oz-inches and the second torque is somewhere between about 3.5 to 4 oz-inches.

Alternatively, the controller 36 is configured to selectively operate the motor 37 in first and second different rotational speed ranges. The first rotational speed range constitutes a first rotational speed and all rotational speeds within a first percentage of the first rotational speed. The second rotational speed range constitutes a second rotational speed and all rotational speeds within a second percentage of the second rotational speed. The magnitude of the second rotational speed is preferably less than about seventy percent of the magnitude of the first rotational speed. The controller 36 may be configured such during normal operation of the low power multistage furnace 8, the rotor 41 is not operable at any rotational speeds between the first rotational speed range and the second rotational speed range except during transitionary periods in which the controller 36 switches operation between the first rotational speed range and the second rotational speed range. This first percentage of the first rotational speed is preferably plus or minus five percent of the first rotational speed and the second percentage of the second rotational speed is plus or minus five percent of the second rotational speed. Preferably, the first percentage of the first rotational speed is plus or minus three percent of the first rotational speed and the second percentage of the second rotational speed is plus or minus three percent of the second rotational speed and more preferably the first percentage of the first rotational speed is plus or minus two percent of the first rotational speed and the second percentage of the second rotational speed is plus or minus two percent of the second rotational speed. More preferably, the first percentage of the first rotational speed is plus or minus one and one-half percent of the first rotational speed and the second percentage of the second rotational speed can be one and one-half percent of the second rotational speed.

Preferably the magnitude of the second rotational speed is less than about sixty percent of the magnitude of the first rotational speed and the magnitude of the second rotational speed is less than about fifty percent of the magnitude of the first rotational speed. Illustrative, but nonlimiting, examples of the first speed include a speed of between about 3,200 rpm and about 3,300 rpm and the second speed may be a speed of between about 2,050 rpm and about 2,350 rpm.

Controller 36 is capable of operating with variances of plus or minus fifteen percent of nominal voltage. This is very helpful for high burn efficiency and the functionality of a vacuum safety switch for a furnace. Controller 18 is preferably programmable so that the present invention is applicable to a wide variety of applications. Controller 36 attaches to a circuit board 43. Clamping mechanism 45, as best illustrated in FIG. 6, is for providing strain relief to an electrical conductor 47. Electrical conductor 47 electrically connects to the controller 36 and provides power thereto.

In the exemplary embodiment, controller 36 is preferably, but not necessarily, a sine drive controller that produces essentially sine wave currents in a plurality of electrical conductors, e.g., plurality of windings, 39 in the stator 38.

Preferably, but not necessarily, a ring member 49, that is shown in FIG. 4, provides support for the circuit board 43. This preferably, but not necessarily, includes an aperture 51 and a u-shaped channel 53. The ring member 49 is located between the end cap 33 and is generally adjacent the stator 38.

Rotor 41, shown in FIG. 4, includes a plurality of permanent magnets 42 mounted on the outer circumference of a rotatable member 44. This rotatable member is preferably symmetrical, e.g., cylindrical, to facilitate rotation of the rotor 40 with the stator 38.

In the exemplary embodiment, there are a plurality of permanent magnets 42, e.g., four, are neodymium magnets, although any suitable permanent magnet may be included that allows the draft inducer 10 to function as described herein.

Rotatable shaft 46 includes a first end portion 48 and a second end portion 50. A center of the rotatable member 44 for the rotor 41 secures the first end portion 48. Located below the rotor 41 and encircling the rotatable shaft 46 along an axis of rotation 58 is a first bearing assembly, e.g., bearing 52, followed by a spring mechanism, e.g., wave spring 56, and then a second bearing assembly, e.g., bearing 54 with the spring mechanism located between the first bearing assembly and the second bearing assembly. This provides for load sharing.

Flange member 60 fixedly attaches to the end of the second end portion 50 of the rotatable shaft 46, which operatively couples to the rotor 41. Flange member 60 secures to a motor cooling fan 62. A motor cooling fan or slinger fan is advantageous since it is a single unit. Motor cooling fan 62 can be any of a wide variety of shapes, sizes and number of blades with the illustrative, but nonlimiting, embodiment includes ten (10) blades that are curved at approximately a ninety-degree angle, as shown in FIG. 4. Motor cooling fan 62 draws air in a manner to cool at least some components of the permanent magnet electrically commuted motor 37. Preferably, the motor cooling fan 62 draws at least some air via the air openings 35.

A bottom shield 64 includes a top portion 72, a lower portion 70 and a plurality of air discharge openings 66, which can be of a myriad of shapes and sizes, preferably rectangular, encircles the motor cooling fan 62. Inner enclosure 68, which is preferably, but not necessarily, cylindrical, receives a flange member 60 for rotation therein. Motor cooling fan 62 is located in the lower portion 70 of the bottom shield 64 having the plurality of air openings 66. Lower portion 70 of the bottom shield 64 includes a lower opening 71, shown in FIG. 4. Motor cooling fan 62 attaches by hardware (not shown) to the flange member 60 and the second end portion 50 of the rotatable shaft 46. As shown in FIG. 4, a plurality of support members 74, e.g., four (4) secure the inner enclosure 68, e.g., cylindrical, to the bottom shield 64. The lower opening 71 is larger than the top opening 73.

There are a wide variety of mechanisms for securing the end cap 33 to the bottom shield 64. An illustrative, but nonlimiting, example includes threaded fasteners. Securing mechanisms include a first bolt 76 through first passageway 78 in the end cap 33, a second passageway 80 in the ring member 26 and a third passageway 82 for securing in the bottom shield 64. Securing mechanisms also include a second bolt 84 through fourth passageway 86 in the end cap 33, a fifth passageway 88 in the ring member 26 and a sixth passageway 90 for securing in the bottom shield 64. A plurality of securable support members 92 secure the bottom shield 64 to another structure.

In addition, these securing mechanisms constitute tensioning members for the clamping mechanism 45. Clamping mechanism 45 includes a first jaw member 61, a second jaw member 63, with the first jaw member 61 being fixed to the end cap 33 and the second jaw member 63 being fixed to the ring member 49 so that at least one tensioning member is adapted and configured for urging at least one of the first and second jaw members 61 and 63 toward the other of the first and second jaw members 61 and 63. Clamping mechanism 45 grips the electrical conductor 47 between the first and second jaw members 61 and 63 to thereby provide strain relief to the electrical conductor 47. Optionally, the first jaw member 61 and the end cap 33 may constitute a unitary mold piece and the second jaw member 63 and the ring member 49 may constitute a unitary molded piece.

Draft inducer blower fan 29 or impeller fan operatively couples the rotor 41 such that rotation of the rotor 41 causes rotation of the draft inducer blower fan 29. An illustrative, but nonlimiting, embodiment includes connecting the draft inducer blower fan 29 to the rotatable shaft 46.

Furthermore, it should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A furnace assembly comprising a non-condensing furnace with a draft inducer, the draft inducer comprising a permanent magnet electrically commutated motor and a draft inducer blower fan, the motor comprising a stator, a rotor, a motor cooling fan, and a controller, the rotor being rotatable relative to the stator, the motor cooling fan being operatively coupled to the rotor such that rotation of the rotor causes rotation of the motor cooling fan, the motor cooling fan being configured and positioned to move air in a manner to cool at least some components of the motor, the draft inducer blower fan being operatively coupled to the rotor such that rotation of the rotor causes rotation of the draft inducer blower fan, the controller being configured to selectively operate the motor in first and second different torque ranges of the rotor, the first torque range constituting a first torque and all torques within five percent of the first torque, the second torque range constituting a second torque and all torques within five percent of the second torque, the magnitude of the second torque being less than about seventy percent of the magnitude of the first torque, the controller being configured such that during normal operation of the furnace assembly the motor is not operable at any torques between the first torque range and the second torque range except during transitionary periods in which the controller switches operation of the motor between the first torque range and the second torque range or the motor transitions between on and off states.

2. A furnace assembly as set forth in claim 1 wherein the magnitude of the second torque is less than about sixty percent of the magnitude of the first torque.

3. A furnace assembly as set forth in claim 1 wherein the magnitude of the second torque is less than about fifty percent of the magnitude of the first torque.

4. A furnace assembly as set forth in claim 1 wherein the motor further comprises an electrical conductor, a first member circumscribing at least a portion of the controller, a second member circumscribing at least a portion of the stator, and a clamping mechanism, the electrical conductor being electrically coupled to the controller, the clamping mechanism comprising a first jaw member, a second jaw member, and at least one tensioning member, the first jaw member being fixed to the first member, the second jaw member being fixed to the second member, said at least one tensioning member being adapted and configured for urging at least one of the first and second jaw members toward the other of the first and second jaw members, the clamping mechanism being adapted and configured to grip the electrical conductor between the first and second jaw members to thereby provide strain relief to the electrical conductor.

5. A furnace assembly as set forth in claim 1 wherein the motor further comprises an electrical conductor, an end cap, a ring member generally adjacent the stator, and a clamping mechanism, the electrical conductor being electrically coupled to the controller, the clamping mechanism comprising a first jaw member, a second jaw member, and at least one tensioning member, the first jaw member being fixed to the end cap, the second jaw member being fixed to the ring member, said at least one tensioning member being adapted and configured for urging at least one of the first and second jaw members toward the other of the first and second jaw members, the clamping mechanism being adapted and configured to grip the electrical conductor between the first and second jaw members to thereby provide strain relief to the electrical conductor.

6. A furnace assembly as set forth in claim 5 wherein the first jaw member and the end cap constitute a unitary molded piece.

7. A furnace assembly as set forth in claim 6 wherein the second jaw member and the ring member constitute a unitary molded piece.

8. A furnace assembly as set forth in claim 7 wherein the end cap comprises a polymeric resinous material.

9. A furnace assembly as set forth in claim 1 wherein the first torque range constitutes the first torque and all torques within three percent of the first torque and wherein the second torque range constitutes the second torque and all torques within three percent of the second torque.

10. A furnace assembly as set forth in claim 1 wherein the first torque range constitutes the first torque and all torques within two percent of the first torque and wherein the second torque range constitutes the second torque and all torques within two percent of the second torque.

11. A method of operating a furnace assembly comprising:
selectively operating a permanent magnet electrically commutated motor and a draft inducer blower fan for a draft inducer of a non-condensing furnace, the motor comprising a stator, a rotor, a motor cooling fan, and a controller, the rotor being rotatable relative to the stator and the motor cooling fan being operatively coupled to the rotor such that rotation of the rotor causes rotation of the motor cooling fan, the motor cooling fan being configured and positioned to move air in a manner to cool at least some components of the motor, the draft inducer blower fan being operatively coupled to the rotor such that rotation of the rotor causes rotation of the draft inducer blower fan, by utilizing the controller in first and second different torque ranges of the rotor, the first torque range constituting a first torque and all torques within five percent of the first torque, the second torque range constituting a second torque and all torques within five percent of the second torque, the magnitude of the second torque being less than about seventy percent of the magnitude of the first torque with the controller being configured such that during normal operation of the furnace assembly, wherein the motor is not operable at any torques between the first torque range and the second torque range except during transitionary periods in which the controller switches operation of the motor between the first torque range and the second torque range or the motor transitions between on and off states.

* * * * *